J. LE C. DAVIS.
ELECTRICAL MEASURING INSTRUMENT.
APPLICATION FILED JUNE 14, 1912.
1,151,761.
Patented Aug. 31, 1915.
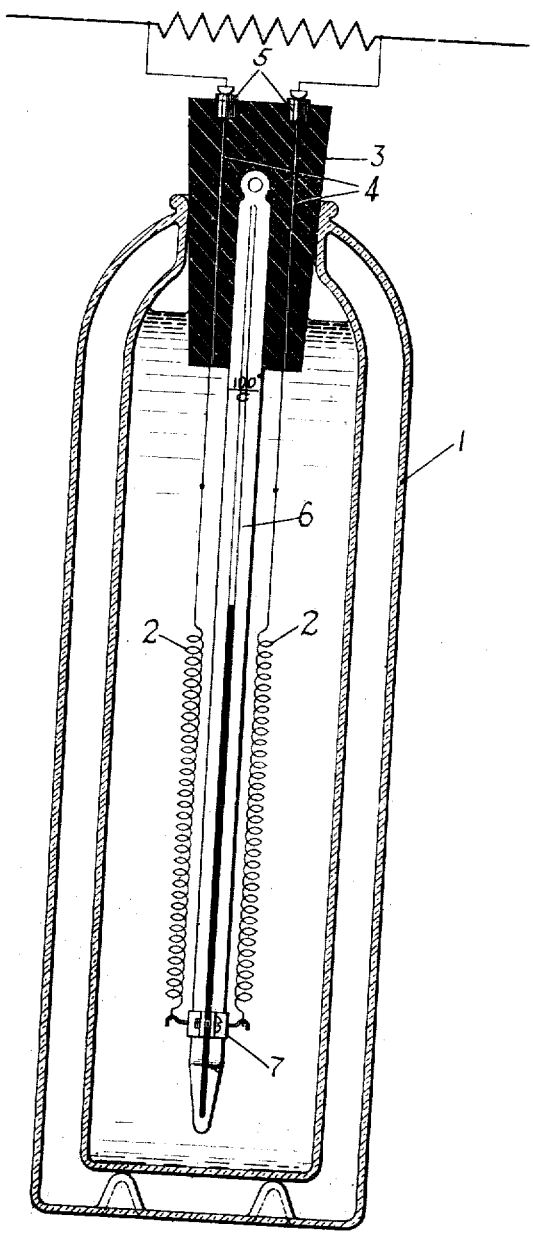

UNITED STATES PATENT OFFICE.

JOSEPH LE CONTE DAVIS, OF PITTSBURGH, PENNSYLVANIA, ASSIGNOR TO WESTING-HOUSE ELECTRIC AND MANUFACTURING COMPANY, A CORPORATION OF PENN-SYLVANIA.

ELECTRICAL MEASURING INSTRUMENT.

1,151,761.     Specification of Letters Patent.     Patented Aug. 31, 1915.

Application filed June 14, 1912. Serial No. 703,631.

*To all whom it may concern:*

Be it known that I, JOSEPH LE CONTE DAVIS, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments, and it has for its object to provide a simple, effective and reliable device whereby the average or integrated amount of energy lost in an electric circuit by the passage of a varying current therethrough for a long period of time may be quickly and accurately determined. The device also permits of readily ascertaining the average of the squared values of a varying current traversing a circuit and, therefore, the square root of the mean square or effective value of the variable current.

In the testing and operation of many kinds of electrical apparatus, it is often desirable to ascertain the average or the integrated value of the currents used in the circuit, and it has heretofore been customary, in ascertaining this value, to make measurements of the current at given regular time intervals. The current values are then squared, added together and then divided by the total number of observations to obtain the average of the squared values of the current. By extracting the square root of the means square value of the current, the effective value of the current is obtained, the effective value of a variable current being that constant current which, if applied continuously for the same time, would give the same heating as the variable current. These computations are laborious and prevent readily ascertaining the desired final values. The present device avoids the necessity of making extensive and laborious computations and renders it possible to obtain the desired values promptly and conveniently.

As shown in the single figure of the accompanying drawing, the device comprises a bottle or other receptacle 1 having double walls with a vacuum between them, or otherwise provided with suitable heat-insulating walls, such bottles being readily obtainable in the market and being commonly known as "thermos bottles." The bottle contains a known quantity of water, or other suitable liquid, having a known specific thermal capacity, and this liquid is adapted to be heated by means of a resistance element 2 of known value that is suspended from a stopper 3 for the bottle and is provided with leads 4 that extend through the stopper and are connected to terminal members 5 mounted in its top. The stopper also carries a thermometer 6 that extends downwardly into the liquid and is provided with a clip 7 near its lower end for assisting in supporting the resistance element.

In the use of the device, the temperature of the liquid is first ascertained. The stopper is then securely inserted in the top of the bottle and the terminals of the resistance element are connected to the circuit, the energy loss in which it is desired to measure, either so that it is traversed by all of the current traversing the said circuit, or, as shown, so that it is traversed by only a portion of the said current, the remainder thereof passing through a suitable resistance or shunt that is interposed in the circuit. After a definite period of time, the resistance element is disconnected from the circuit and the temperature of the liquid is again noted, its temperature having been increased because nearly all of the heat that is produced by the current traversing the resistance element is stored therein. With well constructed thermos bottles, substantially none of the heat will escape during the ordinary periods of test or measurement, and, consequently, the temperature rise of the liquid will be a very accurate indication of the total amount of heat generated by the passage of the current through the resistance element.

Since the specific thermal capacity of the liquid is known, the amount of heat expended in raising the temperature of the liquid to the previously ascertained number of degrees of temperature can be readily determined. Then, by dividing this amount of heat by the number of units of time, the amount of heat produced per unit of time can be ascertained, and this value is equal to the product of the square root of the mean square or effective value of the current multiplied by the resistance. If it is desired to obtain the effective or the square root of the mean square value of the current, the above-mentioned value should be divided by the value of the resistance and the square root of the quotient taken. The computations necessary in any case may be materially facilitated by determining the amount of heat in terms of the number of watts required to raise the temperature of the body of liquid one degree. Then, when the total number of degrees of rise is known, this value may be multiplied by the number of degrees rise to obtain the total amount of heat. The device may be calibrated directly by passing through it known amounts of a steady current and denoting on curves the temperature rise of the liquid after regular intervals of time have elapsed.

The device is of equal application on D. C. and A. C. circuits. On the latter, a current transformer may be used in the main circuit instead of a resistance shunt.

I claim as my invention:

1. A meter comprising a thermos bottle having a removable stopper, a resistor of known value and a thermometer suspended from said stopper within the receptacle and connected together at their lower ends.

2. A meter comprising a receptacle having heat-insulating walls and a removable stopper and containing a definite quantity of liquid having a known specific thermal capacity, a resistor of definite value and a thermometer supported by said stopper within the receptacle.

3. A meter comprising a thermos bottle having a removable stopper and containing a liquid, a resistor for heating the liquid and a thermometer for measuring its temperature, both being suspended from said stopper and connected together at their lower ends.

In testimony whereof, I have hereunto subscribed my name this 4th day of June, 1912.

JOSEPH LE CONTE DAVIS.

Witnesses:
JOHN S. DEAN,
B. B. HINES.

Copies of this patent may be obtained for five cents each, by addressing the "Commissioner of Patents, Washington, D. C."

It is hereby certified that in Letters Patent No. 1,151,761, granted August 31, 1915, upon the application of Joseph Le Conte Davis, of Pittsburgh, Pennsylvania, for an improvement in "Electrical Measuring Instruments," errors appear in the printed specification requiring correction as follows: Page 1, line 104, strike out the word "root"; same page, line 105, before the word "mean" insert the word *root*; and that the said Letters Patent should be read with these corrections therein that the same may conform to the record of the case in the Patent Office.

Signed and sealed this 28th day of September, A. D., 1915.

[SEAL.] J. T. NEWTON,

*Acting Commissioner of Patents.*